United States Patent Office 2,908,658
Patented Oct. 13, 1959

2,908,658

PRINTING PASTE AND PROCESS OF DECORATING TEXTILE THEREWITH

Wilhelm Graulich, Leverkusen - Bayerwerk, Wilhelm Becker, Leverkusen, and Otto Bayer, Leverkusen-Bayerwerk, Germany, assignors to Farbenfabriken Bayer Aktiengesellschaft, Leverkusen, Germany, a corporation of Germany No Drawing. Application December 27, 1956
Serial No. 630,751

Claims priority, application Germany August 22, 1951

12 Claims. (Cl. 260—29.6)

The present invention relates to the printing and decorating of fibrous sheet material, more particularly to a new and improved printing process and printing paste. This application is a continuation-in-part of Serial No. 304,846, filed August 2, 1952.

It is known in the printing of fibrous sheet material according to the pigment printing process to employ polymer latices, which contain as binders vinylidene compounds, such as polyvinyl acetate, methyl or ethyl methacrylate and butadiene, and their copolymers with each other, furthermore combinations of polyvinyl compounds with thermosetting resins.

Especially suitable for these purposes are the copolymer emulsions in which the copolymers contain monomers on the one hand, which when polymerized per se represent typical film formers, and monomers on the other hand, which are cross-linking agents for the film formers. The prints obtained with these latices ordinarily satisfy most requirements, the fastness to rubbing and washing of prints obtained with these latices according to the latter process being of special importance.

It is an object of the invention to provide a novel printing paste and a process for its application, with which the printing or decorating of fibrous sheet material and paper may be carried out with excellent results.

Further objects will become apparent as the following description proceeds.

We have found that excellent results are obtained in the printing of fibrous sheet material according to the pigment printing process by means of polymer emulsions when using emulsions of copolymers which are obtained from polymerisable vinylidene compounds containing reactive groups on the one hand, and polymerizable vinyl or divinyl compounds imparting to the final product elastic properties on the other hand, and reacting said vinyl or divinyl compounds on fixing the printing designs with polyfunctional compounds which are capable of reacting with the reactive groups of the copolymers.

The term "polymerizable vinylidene compounds containing reactive groups" is intended to comprise acrylic acid and methacrylic acid, acrylic amide and methacrylic amide which may be substituted by alkyl groups such as methyl, butyl, hexyl, dodecyl, unsaturated ketones such as vinyl methyl ketone, α-substituted acroleins, such as α-ethyl acrolein and α-chloro acrylates, such as methyl, butyl, hexyl, α-chloro acrylate and vinyl compounds containing amino groups, for instance, the addition compound of 1 mol of a primary amine to 1 mol of hexa-hydro-1,3,5-triacrylyl-s-triazine.

The above said polymerizable vinylidene compounds containing reactive groups are copolymerized according to the invention with vinyl compounds imparting to the polymers elastic properties, particularly acrylates and methacrylates of alcohols having at least 4 carbon atoms such as the butyl, hexyl, dodecyl esters and furthermore butadienes and chloro butadienes which also impart elastic properties to the final products.

Furthermore the copolymers may contain still other components such as styrene, acrylonitrile, 1.1-dichloroethene. The copolymers may further contain other polymerizable vinyl components which may simultaneously act as cross-linking agents, for instance the diacrylates of ethylene glycol.

As polyfunctional, cross-linking compounds which are capable of reacting with the reactive groups of the copolymers may be named the so-called "polyisocyanate-formers," i.e. compounds reacting like polyfunctional isocyanates at elevated temperature (cf. French Patent No. 876,285). As examples may be mentioned the addition products of 1 mol of a diisocyanate and 2 mols of a 1.3-diketone or 1.3-ketone ester like acetic esters and malonic acid esters. Especially well suited are the addition products of bisulfites and polyfunctional isocyanates which possess the advantage of being water-soluble. Furthermore, formaldehyde, its various polymeric modifications and substances yielding formaldehyde such as sodium formaldehyde sulfoxylate may be utilized in practicing the invention. Another example of cross-linking agents which may be employed in the herein described process is the trimeric addition product obtainable from formaldehyde and acrylonitrile, i.e. hexahydro-1.3.5-triacrylyl-s-triazine (see Ballauf and Wegler, Chem. Ber. 81 (1948), page 527 et seq.). Furthermore, di- and poly-amines may be employed.

The choice of the polyfunctional compounds depends on the character of the reactive groups of the copolymer.

It could not be predicted that the reaction of the herein described copolymers containing reactive groups and the various polyfunctional compounds under the conditions usually applied in pigment printing would proceed so as to give prints of excellent properties as regards fastness to rubbing and washing, which fully meet all the practical requirements. The application of reaction for the printing and decorating of textile materials is variable. Thus, it is of no importance whether the textile materials are pretreated with the polyfunctional compounds, or whether these compounds are added to the copolymer, or applied during the drying operation after printing or decorating.

Suitable thickeners for the purposes of pigment printing are the known thickening agents such as gum tragacanth, alkali alginates, aqueous gasoline and aqueous oil emulsions. The formulation of the printing paste is carried out, for instance, by intimately mixing the emulsions or solutions of the binder with the solutions of the thickener and then stirring the pigment dyestuff into the resulting paste. The paste can be diluted with water.

Apart from the possibility of employing a great number of polymers as starting materials the advantage of the process and printing paste of the invention resides in the simplicity and safety of its application since volatile, inflammable solvents are avoided.

The main advantage of the novel printing paste, however, consists in the excellent properties of the prints obtained which are distinctly superior to those obtained by the known printing processes, as regards fastness to rubbing and washing.

Instead of employing the printing paste and the printing process for the printing of textile materials, it may also be applied for the printing and padding of paper. This possibility is of importance especially in the production of wall paper since wall paper which is fast to rubbing and washing is obtained.

The following examples shall serve to illustrate the invention without limiting same; the parts given being by weight.

Example 1

A mixture of:

(a) 70 parts of 1.1-dichloroethene and 30 parts of α-chloro butyl acrylate are emulsified in 150 parts of the aqueous solution of 3 parts of the sodium salt of the sulfonic acids obtained by sulfochlorination of long chain paraffins. The polymerization is activated by addition of 0.5 part of the sodium salt of the sulfinic acids of long chain paraffins and 2 parts of $n/1H_2SO_4$. After polymerizing at 20° C. for 20 hours, a latex of a copolymer content of 39.5 percent is obtained in a yield of 100 percent.

(b) The adjustment of the printing paste is carried out by stirring 35 parts of this latex into a mixture of 15 parts of alginate thickener (25:1000) and 12 parts of turpentine, which has previously been mixed with the acid dimethylamine salt of oleic acid as emulsifier. Into this paste 15 parts of Helio Fast Blue BL paste (20 percent) (Schultz Farbstofftabellen, vol. I, 7th edition, No. 1188) are introduced with stirring, and 15 parts of a 25 percent weakly acetic acid aqueous solution of hexamethylene diamine are added thereto (preferably an excess quantity of 10 percent calculated on the amount of the acetic acid is used). The mixture is then adjusted with water to 100 parts.

The prints obtained on cotton fabrics with this printing paste show, after condensing at 140–145° C., excellent fastness to rubbing and washing and a soft feel.

Example 2

(a) A mixture of 30 parts of butadiene, 40 parts of methyl methacrylate and 30 parts of α-ethyl acrolein are emulsified in 150 parts of an aqueous solution of 3 parts of the sodium salt of sulfonic acids obtained by sulfochlorination of long chain paraffins. The polymerization is activated by addition of 0.5 part of the sodium salt of the sulfinic acids of long chain paraffins and 2 parts of $n/1H_2SO_4$. After polymerizing at 18° C. for 24 hours a latex of a polymer content of 37.5% is obtained.

(b) The adjustment of the printing paste is carried out by adding 35 parts of this latex to a mixture of 35 parts of turpentine and 2 parts of benzyl-o-hydroxy-diphenyl-polyglycol-ether with intimate mixing. Into this paste 20 parts of Naphthol AS/ITR (Schultz Farbstofftabellen, vol. I, 7th edition, No. 50) (paste 20 percent) are introduced with stirring. 10 parts of the hexamethylene diamine solution described in Example 1 are then added.

(c) Instead of the above cross-linking agents 15 parts of a 10 percent aqueous solution of the acetate of a basic polyurea prepared from 0.2 mol of diethylene triamine,
0.8 mol of γ.γ-diamino dipropylmethylamine,
1.0 mol of hexane diisocyanate, may be employed. Since thickening is already brought about by this product to a certain degree, 30 parts only of turpentine have still to be added.

The prints obtained with this priniting paste are steamed; they are excellently fast to washing and rubbing.

Example 3

A copolymer emulsion is prepared from 20 parts of acrylonitrile, 60 parts of 1.1-dichloroethene and 20 parts of acrylic acid monobutylamide as described in Example 1. The latex (40 percent) obtained is used for preparing a printing paste according to Example 1. Instead of the acetic acid hexamethylene diamine solution indicated in Example 1 one of the following components are added:

(a) 15 parts of formaldehyde (30 percent), or
(b) 1.5 parts of hexahydro-1.3.5-triacrylyl-s-triazine (the trimeric addition product obtained from formaldehyde and acrylonitrile, see Ballauf and Wegler, Chem Ber. 81 (1948), page 527 et seq.), or
(c) 15 parts of the addition product of malonic acid and hexamethylene diisocyanate (cf. French Patent 876,285), which liberates the diisocyanate on heating (at higher temperatures).

The prints prepared by means of the above cross-linking agents are distinguished by good fastness properties.

Example 4

The mixture consisting of 25 parts of acrylonitrile, 35 parts of 1.1-dichloroethene, 30 parts of butyl acrylate and 5 parts of methacrylic acid is emulsified in 150 parts of an aqueous solution of 3 parts of the sodium salt of the sulfonic acids of long chain paraffins. The polymerization process is activated by addition of 0.6 part of the sodium salt of the sulfinic acids of long chain paraffins and the mixture is adjusted to a pH value below 5. After polymerizing at 20° C. for 20 hours, a copolymer emulsion of about 38.5 percent polymer content is obtained which can be made into a paste by addition of concentrated ammonia in known manner.

A printing paste is adjusted with the above emulsion according to Example 1b; the cross-linking agent described in Example 1, i.e. the acetic acid hexamethylene diamine solution, however, is replaced by 1.5 parts of hexahydro-1.3.5-triacrylyl-s-triazine (see Example 3b). The prints obtained with this printing paste are distinguished by their brightness of shades and a soft feel. They are especially fast to washing and solvents such as tetrachloro ethene, dichloro ethylene and perchloro ethylene.

Example 5

A copolymer emulsion of 30 parts of butadiene, 50 parts of methyl methacrylate and 20 parts of α-cyano-sorbinic-acid ethyl-ester is prepared by emulsifying the mixture of said reactants in a solution of 5 parts of the sodium salt of dibutyl naphthalene sulfonic acid in 145 parts of water with the addition of 0.4 part of sodium hydroxide, 0.5 part of potassium per. sulfate and 0.4 part of sodium hydrosulfite. After polymerizing at 30° C. for 36 hours the monomers have completely reacted. A latex of a polymer content of 37.5 percent is obtained.

The formulation of a printing paste is carried out as described in Example 1b, however, 1.5 parts of hexahydro-1.3.5-triacrylyl-s-triazine are used as cross-linking agent instead of the hexamethylene diamine solution. The prints obtained with this printing paste show on rayon staple fabrics and cotton fabrics good fastness properties.

Example 6

A copolymer emulsion is prepared from 30 parts of butadiene, 20 parts of styrene, 30 parts of butyl acrylate, 20 parts of acrylonitrile and 3 parts of acrylamide as described in Example 1. The emulsion (about 39 percent) obtained shows a rather high viscosity.

The formulation of a printing paste is carried out by adding to 40 parts of the above emulsion, 5 parts of a 20 percent aqueous solution of benzyl-p-hydroxy diphenyl polyglycol ether, 5 parts of methyl cellulose (70:1000), 15 parts of a 20 percent blue copper phthalocyanine dyestuff paste, 1.5 parts of hexahydro-1.3.5-triacrylyl-s-triazine and 23.5 parts of water. The prints obtained with this printing paste on cotton fabrics and rayon staple fabrics show good fastness properties after fixing by steaming or condensing.

Example 7

150 parts of an aqueous latex of a polymer content of 40 percent, which is prepared as described in Example 3, is mixed with 50 parts of a 20 percent aqueous solution of p-hydroxy diphenyl polyglycol ether, 3 parts of methyl cellulose (70:1000), 1.5 parts of hexahydro-1.3.5-triacrylyl-s-triazine, 10 parts of a pigment dyestuff paste (15 percent), 150 parts of a gasoline emulsion in water and 5 parts of paraffin sulfonyl amide. The mixture is filled up with water to 1000 parts.

The above mixture is slop-padded on rayon staple fabrics, cotton and other fabrics on a padding machine, dried in heating apparatus at 110° C. in the usual manner and thereby fixed to the fibre. The dyeings thus obtained are distinguished by very good fastness to rubbing and washing.

We claim:
1. An aqueous printing paste consisting essentially of an emulsion of a water-insoluble copolymer of at least one compound (a) corresponding to the general formula

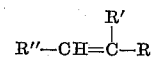

wherein R stands for a radical selected from the group consisting of an aldehyde group, a carboxylic group and a carbonamide group with at least one free hydrogen atom, R' stands for a radical selected from the group consisting of hydrogen, methyl and ethyl, and R'' for a radical selected from the group consisting of hydrogen and methyl; and at least one compound (b) selected from the group consisting of an alkyl acrylate and an alkyl methacrylate, the alkyls having at least four carbon atoms, and butadiene; a polyfunctional compound selected from the group consisting of (1) an acetic acid salt of hexamethylene diamine, (2) hexahydro-1,3,5-triacrylyl-s-triazine, and (3) an addition product of an organic diisocyanate, which product will liberate said organic diisocyanate at temperatures up to 200° C.; a pigment; and a thickening agent.

2. An aqueous printing paste as claimed in claim 1, wherein the copolymer consists essentially of at least one compound (a) corresponding to the general formula

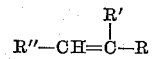

wherein R stands for a radical selected from the group consisting of an aldehyde group, a carboxylic group and a carbonamide group with at least one free hydrogen atom, R' stands for a radical selected from the group consisting of hydrogen, methyl and ethyl, and R'' for a radical selected from the group consisting of hydrogen and methyl, and at least one compound (b) selected from the group consisting of an alkyl acrylate and an alkyl methacrylate, the alkyl having at least four carbon atoms, and butadiene; and a compound (c) selected from the group consisting of styrene, acrylonitrile, 1,1-dichloroethene and an alkyl methacrylate, the alkyl group of which has at most 3 carbon atoms.

3. A printing paste consisting essentially of (1) an emulsion of a copolymer of methylmethacrylate, α-ethyl acrolein and butadiene, (2) the acetic acid salt of hexamethylene diamine, (3) a pigment, (4) a thickening agent, and (5) water.

4. A printing paste consisting essentially of (1) an emulsion of a copolymer of acrylic acid monobutyl amide, acrylonitrile, and 1,1-dichloroethene, (2) the addition product of malonic acid and hexamethylene diisocyanate, (3) a pigment, (4) a thickening agent, and (5) water.

5. A printing paste consisting essentially of (1) an emulsion of a copolymer of butyl acrylate, acrylonitrile, 1,1-dichloroethene and methacrylic acid, (2) hexahydro-1,3,5-triacrylyl-s-triazine, (3) a pigment, (4) a thickening agent and (5) water.

6. A printing paste consisting essentially of (1) an emulsion of a copolymer of acrylamide, acrylonitrile, butyl-acrylate, butadiene and styrene, (2) hexahydro-1,3,5-triacrylyl-s-triazine, (3) a pigment, (4) a thickening agent, and (5) water.

7. A process of decorating a textile which comprises applying to said textile a printing paste having the composition of claim 1, and then heating said textile for a time and at a temperature sufficient to cure the resin, whereby the latter is fixed to the textile.

8. A process of decorating a textile which comprises applying to said textile a printing paste having the composition of claim 2, and then heating said textile for a time and at a temperature sufficient to cure the resin, whereby the latter is fixed to the textile.

9. A process of decorating a textile which comprises applying to said textile a printing paste having the composition of claim 3, and then heating said textile for a time and at a temperature sufficient to cure the resin, whereby the latter is fixed to the textile.

10. A process of decorating a textile which comprises applying to said textile a printing paste having the composition of claim 4, and then heating said textile for a time and at a temperature sufficient to cure the resin, whereby the latter is fixed to the textile.

11. A process of decorating a textile which comprises applying to said textile a printing paste having the composition of claim 5, and then heating said textile for a time and at a temperature sufficient to cure the resin, whereby the latter is fixed to the textile.

12. A process of decorating a textile which comprises applying to said textile a printing paste having the composition of claim 6, and then heating said textile for a time and at a temperature sufficient to cure the resin, whereby the latter is fixed to the textile.

References Cited in the file of this patent

UNITED STATES PATENTS

| | | |
|---|---|---|
| 2,536,050 | Fluck | Jan. 2, 1951 |
| 2,643,958 | Kleiner et al. | June 30, 1953 |
| 2,813,083 | Craemer | Nov. 12, 1957 |

OTHER REFERENCES

Gams et al.: "British Plastics," February 1943, pages 508–520.